V. WILLIMACK.
SHARPENER FOR LAWN MOWER CUTTERS.
APPLICATION FILED MAY 27, 1909.
939,885.
Patented Nov. 9, 1909.
2 SHEETS—SHEET 1.
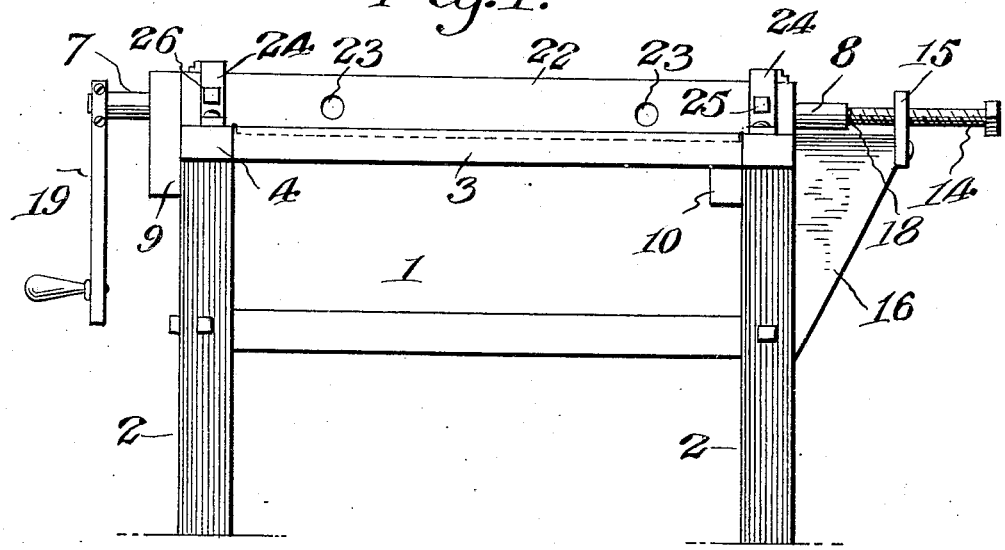
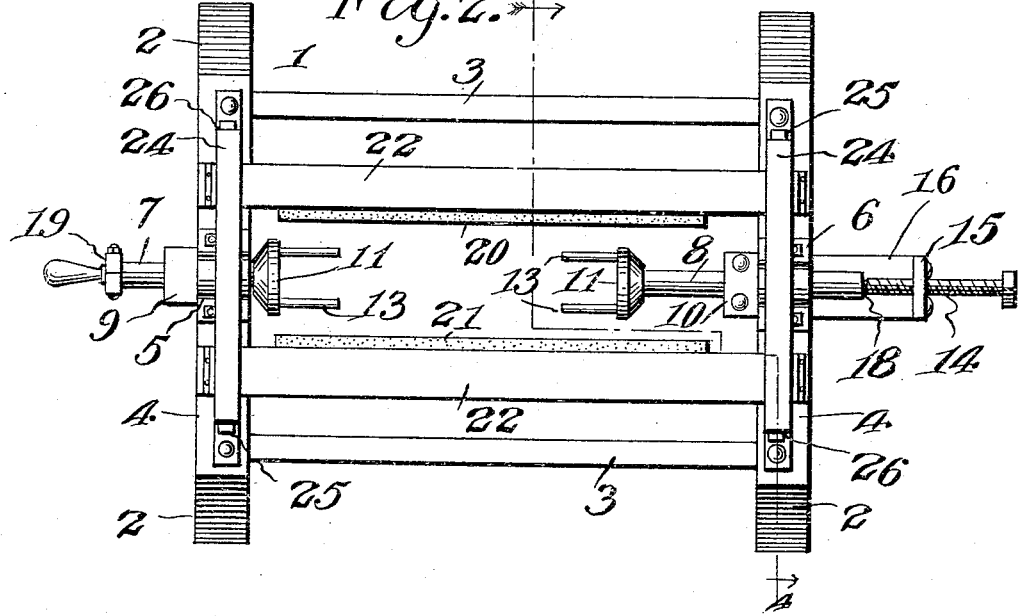
WITNESSES:—
Joe. P. Wahler
E. M. Rickette
INVENTOR
V. Willimack
By Walson E. Coleman
Attorney V. WILLIMACK.
SHARPENER FOR LAWN MOWER CUTTERS.
APPLICATION FILED MAY 27, 1909.
939,885.
Patented Nov. 9, 1909.
2 SHEETS—SHEET 2.
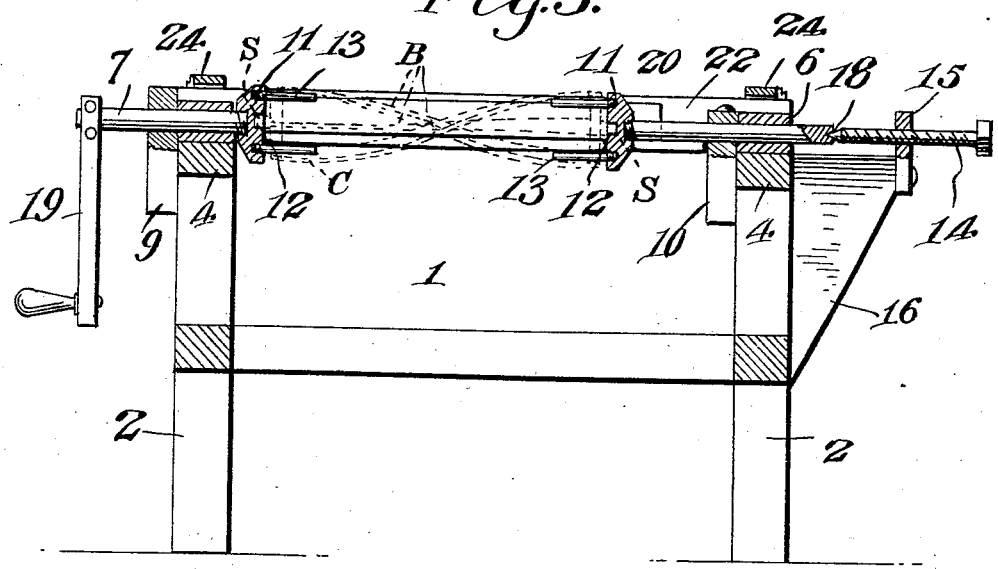
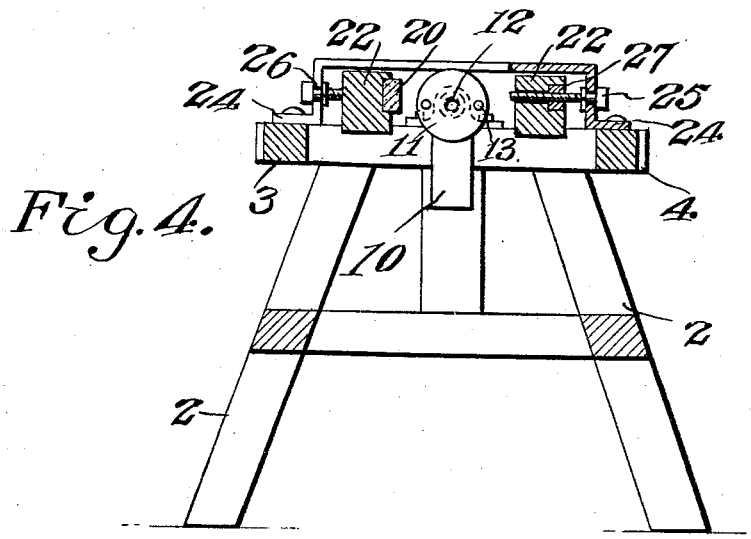
WITNESSES:—
INVENTOR
V. Willimack
By Watson E. Coleman
Attorney

UNITED STATES PATENT OFFICE.

VINCEL WILLIMACK, OF LOST NATION, IOWA.

SHARPENER FOR LAWN-MOWER CUTTERS.

939,885.  Specification of Letters Patent. Patented Nov. 9, 1909.

Application filed May 27, 1909. Serial No. 498,665.

*To all whom it may concern:*

Be it known that I, VINCEL WILLIMACK, a citizen of the United States, residing at Lost Nation, in the county of Clinton and State of Iowa, have invented certain new and useful Improvements in Sharpeners for Lawn-Mower Cutters, of which the following is a specification, reference being had to the accompanying drawings.

This invention relates to improvements in sharpening devices or machines for the rotary cutters of lawn mowers and the like.

The object of the invention is to provide a simple and practical machine of this character which will be strong, durable and comparatively inexpensive in construction, and which may be readily adjusted to receive and effectively sharpen the cutters of different sized lawn mowers.

With the above and other objects in view, the invention consists of the novel features of construction and the combination and arrangement of parts hereinafter fully described and claimed, and illustrated in the accompanying drawings, in which—

Figure 1 is a side elevation of the improved sharpener; Fig. 2 is a top plan view; Fig. 3 is a vertical longitudinal section; and Fig. 4 is a vertical transverse section.

In the drawings 1 denotes a support preferably in the form of a stand having connected legs 2 for supporting a horizontal rectangular top consisting of side bars 3 united by end bars 4.

Arranged centrally upon the top of the end bars 4 are bearings 5, 6 for two longitudinally alined shafts 7, 8 between which latter the rotary cutter of a lawn mower is mounted. If desired, supplemental bearings 9, 10 may be provided for these shafts to maintain them in more perfect alinement. The inner ends of the two shafts have secured to them circular heads 11 formed with central openings 12 to receive the ends of the shaft S of the rotary cutter C of a lawn mower, and said heads are also provided with inwardly extending pins 13 to enter between the arms of the heads H of the cutter C to cause the latter to rotate with the shaft. To permit the cutters to be applied to and removed from the heads 11, the shaft 8 is longitudinally slidable in its bearings 6, 10 and is retained in an adjusted position by a screw 14 arranged in longitudinal alinement with said shaft and rotatable in a stationary nut 15 carried by a bracket 16 on the adjacent end of the frame. The outer end of the screw has a cone-shaped point 18 to enter a similar-shaped seat in the outer end of the shaft 8. On the outer end of the shaft 7 is a crank handle 19 by means of which said shaft and hence the cutter C and shaft 8 may be rotated.

The blades B on the arms or heads of the cutter C are adapted to be moved across one or more grinding or sharpening surfaces 20, 21 adjustably mounted on the top of the stand. These grinding surfaces are preferably in the form of blocks of emery or the like mortised or set in longitudinal bars 22 and when two of said emery blocks are provided, as shown in the present embodiment of the invention, one is preferably made coarse for grinding down the blades B while the other is made fine for finishing or dressing up the blades. To permit the emery blocks 20, 21 to be readily removed from the recesses or seats in the bars 22, openings 23 are formed in the latter for the insertion of a suitable instrument, as will be readily understood. The ends of the grinding surface supports or bars 22 are slidably mounted in inverted U-shaped guide brackets 24 arranged over the end bars 4 and having their angularly bent depending ends bolted or otherwise secured to said bars 4. Adjusting screws 25 are swiveled at 26 in the upright end portions of the guide brackets 24 and have their threaded ends working in threaded openings or nuts 27 in the bars or supports 22 so that when said screws are rotated said bars or supports 22 may be adjusted toward or from the blades of the cutter.

In operation, when it is desired to apply the rotary cutter of a mowing machine to the machine, the screw 14 is screwed outwardly to permit the shaft 8 to be moved in the same direction sufficiently to enable the cutter C to be inserted between the heads 11. Said shaft 8 is then moved inwardly and the screw 14 is adjusted to hold the shaft in such position so that the cutter C will be caused to rotate with the shaft when the crank handle 19 is turned. After the cutter is thus applied, the coarse emery block is adjusted toward it by manipulating the screws 25 of its bar or support 22, and after the blades of the cutter have been sufficiently ground by this coarse grinding surface, the screws 25 of the bar or support 22 of the other finer grinding surface are adjusted to cause such finer surface to put the proper finish on the blades.

From the foregoing it will be seen that the invention provides an exceedingly simple and practical machine which may be produced at a small cost and will be strong and durable in use and which is exceedingly well adapted for effectively sharpening the blades of rotary cutters used on lawn mowers and similar machines.

Having thus described the invention what is claimed is:

1. In a machine of the character described, the combination of a stand having a top composed of longitudinal and end bars, inverted U-shaped guide members on said end bars, longitudinal bars slidable in said guide members, coarse and fine grinding surfaces arranged in the opposing faces of said slidable bars, screws for adjusting said slidable bars, longitudinally alined shafts journaled in the bearing on the end bars of the stand, one of said shafts being longitudinally slidable, means for adjusting said slidable shaft, means for rotating the other shaft and means upon the opposing ends of said shafts for supporting work between said grinding surfaces.

2. In a machine of the character described, the combination of a support, inverted U-shaped guide members on said support, a longitudinal bar slidable in said guide members and carrying a grinding surface, screws in said guide members for adjusting said bar, longitudinally alined shafts journaled in bearings on said support, one of said shafts being longitudinally slidable, means for adjusting said slidable shaft, means for rotating the other shaft, means upon the opposing ends of said shafts for supporting work.

3. In a machine of the character described, the combination of a stand having a top composed of side and end bars, transverse guide members on said end bars, a longitudinal bar having its ends slidable in said guide members and its inner face recessed, a grinding block arranged in the recess of said bar, screws for adjusting said bar, opposing bearings on said end bars, longitudinally alined shafts in said bearings, one of said shafts being longitudinally slidable, a crank handle on the outer end of the other shaft, a bracket on one end of the stand, a stationary nut on said bracket, and an adjusting screw in said nut to engage the outer end of the slidable shaft, heads upon the opposing inner ends of said shafts and formed with centrally arranged seats to receive the ends of a shaft of a lawn mower cutter, longitudinally projecting pins on said heads to engage the ends of the lawn mower cutter.

In testimony whereof I hereunto affix my signature in the presence of two witnesses.

VINCEL WILLIMACK.

Witnesses:
 FRED DICKMAN,
 A. L. COOK.